Oct. 29, 1968

J. E. LARSEN 3,407,488

METHODS FOR ALTERING THE CONFIGURATION OF
ELECTRICALLY CONDUCTIVE TURNS OF
INDUCTIVE DEVICES

Original Filed July 28, 1966

INVENTOR.
John E. Larsen,
BY John M. Stoudt
Attorney.

Oct. 29, 1968 J. E. LARSEN 3,407,488
METHODS FOR ALTERING THE CONFIGURATION OF
ELECTRICALLY CONDUCTIVE TURNS OF
INDUCTIVE DEVICES
Original Filed July 28, 1966 3 Sheets-Sheet 2
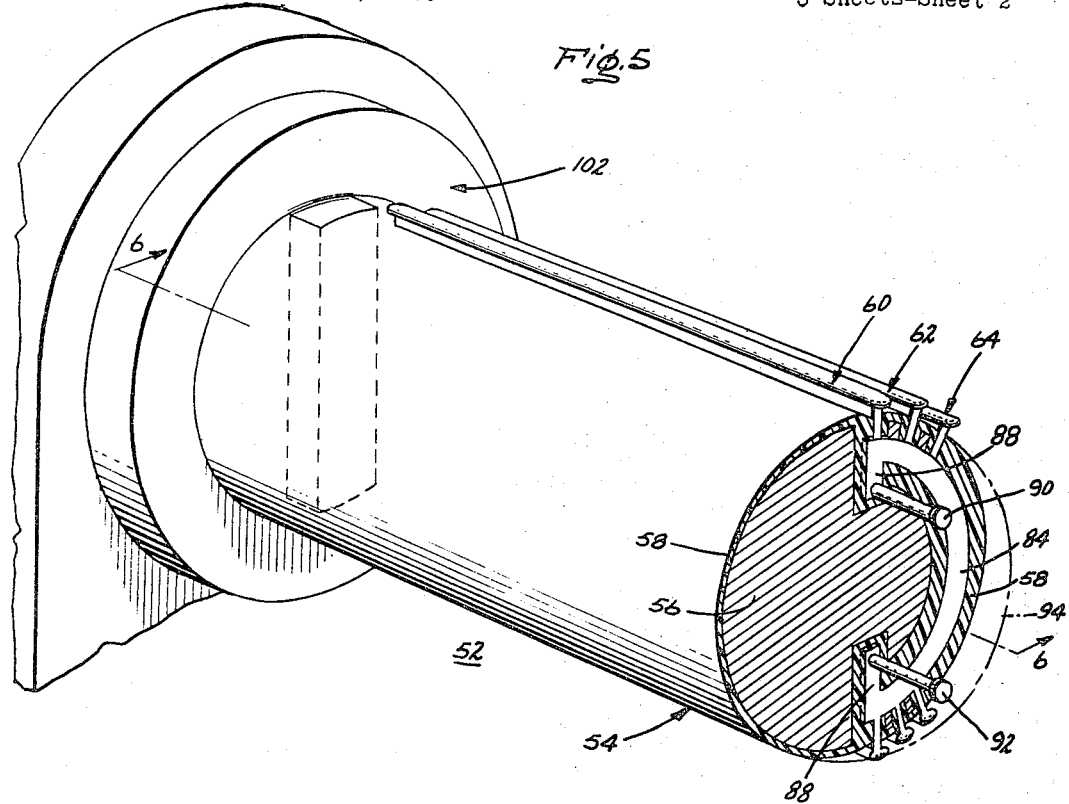
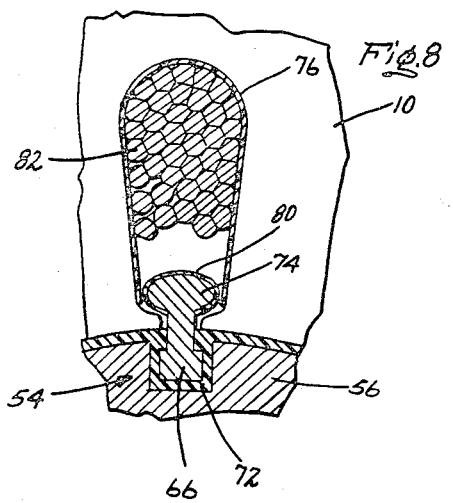
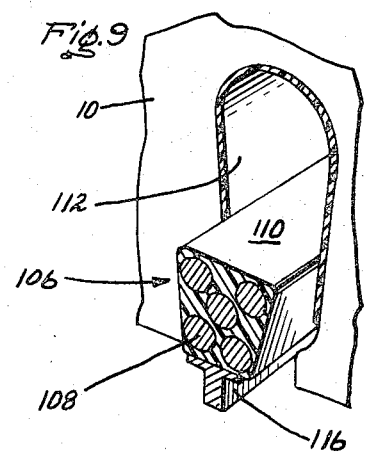
INVENTOR.
John E. Larsen,
BY John M. Stoudt
Attorney.

Oct. 29, 1968            J. E. LARSEN            3,407,488
METHODS FOR ALTERING THE CONFIGURATION OF
ELECTRICALLY CONDUCTIVE TURNS OF
INDUCTIVE DEVICES
Original Filed July 28, 1966            3 Sheets-Sheet 3
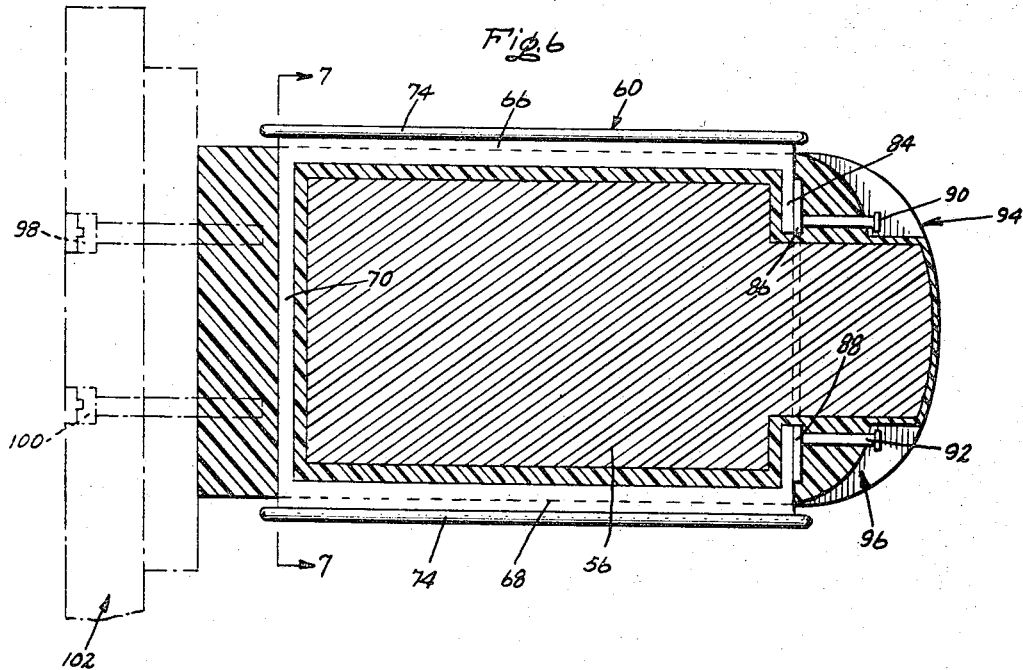
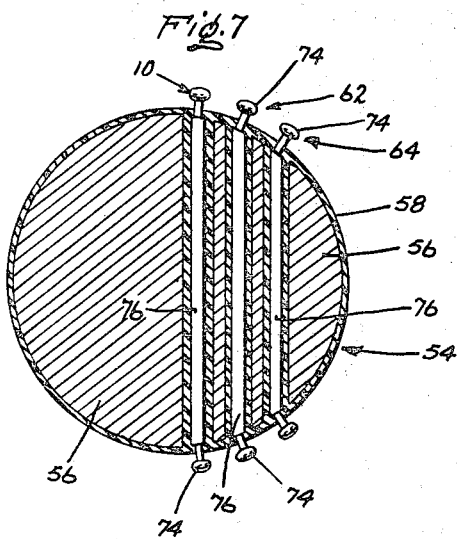
INVENTOR.
John E. Larsen,
BY John M. Stoudt
Attorney.

United States Patent Office 3,407,488
Patented Oct. 29, 1968

3,407,488
METHODS FOR ALTERING THE CONFIGURATION OF ELECTRICALLY CONDUCTIVE TURNS OF INDUCTIVE DEVICES
John E. Larsen, Fort Wayne, Ind., assignor to General Electric Company, a corporation of New York
Original application July 28, 1966, Ser. No. 568,588. Divided and this application Oct. 12, 1967, Ser. No. 674,804
19 Claims. (Cl. 29—596)

ABSTRACT OF THE DISCLOSURE

In altering the configurations of electrically conductive turns carried in the slots of a magnetic core, a rigid electrical conductor is supported in the slots next to the turns and connected across output terminals of an electrical surge source. A surge is injected from the source into the rigid conductor to generate an electrical energy surge in the turns, creating forces of sufficient magnitude to change the cross-section of a majority of the turns carried by the slot. The majority of the turns in the slot, altered into non-circular cross-section configurations, and their final relative turn positions in the slots are primarily determined by forces acting on the turns of approximately 10,000 pounds per square inch or more thereby producing compacted turns in the slot having a slot space factor in excess of 60%. Not only unusually high slot space factors are provided for the conductors, but in addition, the turns are wedged tightly within the slot so that they may be retained therein without need for auxiliary holding devices during subsequent stages of fabrication.

Cross-reference to related application

This application is a division of my co-pending application, Ser. No. 568,588 filed July 28, 1966.

Background of the invention

This invention relates generally to improved methods for altering the configuration of electrically conductive turns. More particularly, the invention relates to improved methods for pressing back conductor turns relative to their initial position in magnetic cores.

Electromagnetic devices such as magnetic cores used in electrical motors, generators and the like customarily incorporate one or more electrical coils wound from a number of relatively flexible insulated conductor turns. The manufacture of these devices has in the past posed certain problems, especially in the development of wound coils in the magnetic cores.

One of the manufacturing techniques used to place electrical conductor turns in the slots of magnetic cores during the development of wound coils is that of winding conductor turns directly into the slots and thereafter compacting or pressing back the turns toward the slot bottoms. Another technique commonly used to place electrical conductor turns in core slots is that of forming a wound coil of conductor turns at one location and then transferring the wound coil into the core slots. However in either technique it is exceedingly difficult to achieve slot space factors above 60%. Accordingly, the number of turns which can be placed in any one slot is limited when using these techniques. Even with conventional mechanical press-back equipment currently available, it is unusually difficult to increase the slot space factors above 75%, when using conventional round or nearly round conductors, without appreciable problems, such as causing undue damage to the conductor insulation.

It is, therefore, desirable to be able to achieve higher slot space factors (80% and above) than were heretofore feasible, while avoiding the well-known difficulties involved with the use of conventional mechanical pressback equipment (e.g., expense, lack of speed, and damage to wire insulation). This is especially desirable as it will allow more conductor turns to be placed in any one slot and will therefore allow relatively inexpensive aluminum conductor wire to be more widely used as compared with copper wire for a given core design. More turns of aluminum than copper conductors are required, of course, for a given slot volume to achieve the same rating in view of the differences in their electrical conductivity properties. Further, it is desirable to be able to wedge conductor turns into the slots of magnetic cores regardless of the slot configuration, thereby to retain the turns in the slots without the need for auxiliary holding means during subsequent stages of fabrication.

United States Patents 3,333,327–3,333,330 inclusive and 3,333,335 all issued Aug. 1, 1967, which are assigned to the same assignee as this application, disclose novel and unique ways of compacting or otherwise transforming coils in electromagnetic devices involving the use of electrical energy, in one form or another. It is highly desirable to make use of the electrical energy approach to accomplish the desired results set forth above.

Accordingly, it is a general object of the instant invention to provide improved methods for altering the configurations of conductive turns useful in electrical inductive devices so as to achieve at least some of the desirable results mentioned above.

A more specific object of the present invention is the provision of improved methods of compacting and pressing back conductor turns in the slots of magnetic cores thereby to pack a greater number of turns into the slots in a most expeditious and efficient manner.

Another specific object of the instant invention is the provision of improved methods for wedging conductor turns into the slots of magnetic cores to provide slot space factors in excess of 60%.

A further object of the present invention is to provide novel and improved methods for altering the overall configuration of wound coils carried in coil accommodating slots of magnetic cores and developing these wound coils in the slots; the altering and developing including for example, pushing back the end turn portions of a coil, compacting the turns at the side portions and end turn portions, moving the side turn portions toward the slot bottoms, and changing the cross-section of the side turn portions.

Summary of the invention

In carrying out my invention in one form, I provide an improved method of altering the configuration of electrically conductive turns comprising at least a portion of electrical coils carried in coil accommodating slots of a magnetic core. In one illustrated exemplification, rigid conductor means is supported in selected coil accommodating slots of the magnetic core, corresponding in the exemplification to the slots accommodating at least one of the side portions of a wound electrical coil. The rigid conductor means is electrically connected across the output terminals of an electrical energy surge source, and a surge of electrical energy is injected into the conductor means, thereby establishing a transient magnetic field and electromagnetic forces to press the electrically conductive turns back in their coil accommodating slots. The surge may be of sufficient magnitude to change the cross-section of a majority of the individual conductor turns carried in a slot.

In accordance with a more specific aspect of my invention, nonmagnetic electrically conductive material capable of conducting eddy currents is supported adjacent the entrance of a coil accommodating slot having conductor turns and rigid conductor means therein. The material is also supported adjacent the end turn portions of the coil, thereby establishing forces during the injection step to rigidly support the conductor means in the slots and to press-back the coil end turn portions.

The methods of turn alteration in accordance with my invention are efficient and economical, and as well provide high slot space factors since the forces generated to effect press-back may be great enough to change the cross-section of at least a majority of the conductor turns in a slot. By changing the cross-section of the conductor turns, a greater compaction of the turns in the slots is possible, and a greater number of turns may therefore be accommodated in the slots. Thus, the availability of high slot space factors provided by my methods will allow aluminum conductor wire to be used, if so desired. A further advantage of my method is that upon a change in cross-section of the conductor turns, the turns will be wedged into the slots. The turns will thereby be retained in the slots without the need for auxiliary holding means during subsequent stages of fabrication of inductive devices utilizing the magnetic cores. In addition, by the practice of my method, the conductor insulation is not adversely affected as there is no physical contact with the wire insulation during the alteration or developing operations.

The subject matter which I regard as my invention is particularly pointed out and distinctly claimed in the concluding portion of this specification. The invention itself, however, together with further objects and advantages thereof may be best understood by reference to the following description taken in conjunction with the accompanying drawings.

*Brief description of the drawings*

FIGURE 5 is a perspective view, partially in cross-section, of one form of apparatus useful in practicing the method of my invention;

FIGURE 6 is a vertical sectional view taken substantially on the plane of the line 6—6 of FIGURE 5;

FIGURE 7 is a vertical sectional view taken substantially on the plane of the line 7—7 of FIGURE 6;

FIGURE 8 is an enlarged fragmentary view of one coil-accommodating slot illustrating the final distribution of the individual conductor turns carried therein when practicing the method of my invention with the apparatus illustrated in FIGURES 5–7; and FIGURE 9 is a partial perspective view, partially in vertical section of one coil-accommodating slot of a stator, and still another exemplified form of apparatus useful for practicing the method of my invention.

*Description of the preferred embodiments*

Figure 1:
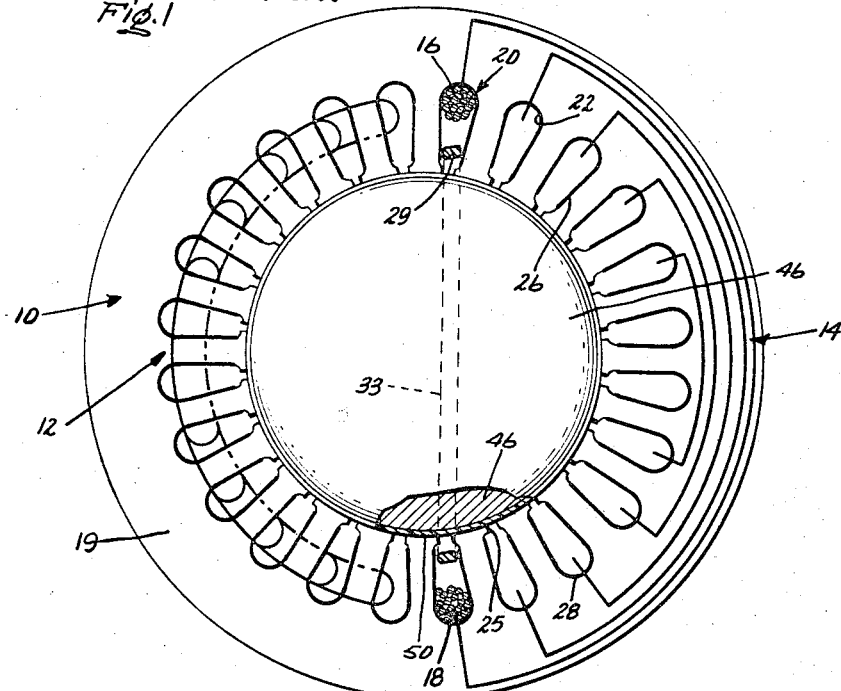
FIGURE 1 is an end view of the stator core with two coil groups shown in the coil-accommodating slots of the core, and including first exemplified apparatus for carrying out the turn altering or developing methods of my invention, the apparatus of the exemplification including rigid conductor means supported in selected coil-accommodating slots of the core and a rigid structure of nonmagnetic electrically conductive material disposed in the bore of the core.

For the purpose of explaining the principles of my invention, I have illustrated in FIGURES 1–4 inclusive various aspects of my improved method as applied to a stator core generally denoted by reference numeral 10. The core 10 carries two coil groups 12 and 14 comprising the main running winding for a two-pole induction motor. It will be noted that each coil group 12 and 14 includes five wound coils, each coil including a plurality of individually wound insulated flexible conductor turns. The exemplified stator core 10 includes twenty-four coil-accommodating slots for accommodating the wound coils. In a stator core of the type illustrated in FIGURE 1, opposed coil-accommodating slots such as 16, 18, and 22, 24, and 26, 28 each carry one wound coil therein. As will be noted, I have illustrated in cross-section the individual conductor turns 21 of the one wound coil 20 carried in the stator core coil-accommodating slots 16 and 18.

Figure 3:
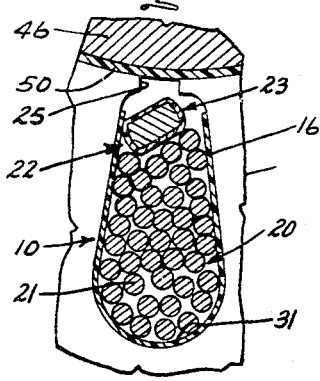
FIGURE 3 is an enlarged fragmentary view of one coil-accommodating slot of the stator shown in FIGURES 1 and 2, illustrating the distribution of the individual conductors after insertion of a coil side portion into the slot and prior to the altering or development of the conductor turns in the slot, with the rigid conductor means in a first position in the slot relative to the conductor turns and the electrically conductive nonmagnetic material.

In the illustrated exemplification, the one wound coil 20 includes forty individual conductor turns 21, the side portions of the coil 20 being accommodated in the slots 16 and 18 and the end turn portions projecting axially beyond the stator end faces 19. In addition, the three pairs of slots 16, 18; 22, 24; and 26, 28 each carry coils composed of a relatively large number of individual conductor turns. Further, the slot pairs 22, 24 and 26, 28 are adapted to receive start windings including additional conductor turns as well as the conductor turns of the wound coils comprising a portion of the main or running winding. Accordingly, it is most desirable to press-back the coil side portions of the coils carried in these three pairs of slots in order to accommodate the maximum number of turns. As explained above, it is desirable to achieve the highest possible slot space factor, or the greatest ratio of slot area actually filled with conductor turns as compared to the available slot area so as to accommodate the maximum number of turns therein, while not damaging the conductor insulation. In FIGURE 3, I have illustrated the forty conductor turns 21 of the wound coil 20 located in the slot 18 after the side portions of the wound coil have been inserted in the slot and prior to the altering or developing method of my invention. As will be noted in FIGURE 3, the conductor turns 21 are loosely located in the slot 18, with voids or spaces therebetween, and hence the slot space factor is relatively low. It is anticipated, for example, that if the wound coil 20 were placed in the stator core 10 by a machine, such as is disclosed in the United States Patent 2,934,099 granted to Lowell M. Mason on Apr. 26, 1960, the slot space factor would be in the neighborhood of 60%.

Since it is desirable to compact the individual conductors in the slot 18 in order to achieve a slot space factor in the range of 80 to 85 percent, according to one form of my invention, I support rigid conductor means generally denoted by reference number 22 in the slot 18 between the slot entrance 25 and the slot bottom wall 31. The rigid conductor means 22 is thereby in inductively or transformer-coupled relationship with the conductor turns 21 located in the slot 18. The coil 20 provides a closed path for the flow of induced current. In the exemplification, I connect the rigid conductor means 22 across the output terminals 27 and 29 of an energy surge source generally denoted by reference numeral 32.

The energy surge source 32 used in the illustrative exemplification of the invention may be any suitable source, such as one of the capacitor discharge energy source disclosed in the aforementioned U.S. patents issued on Aug. 1, 1967, with a capability of supplying an electrical power surge of sufficient magnitude. Accordingly, when the surge source 32 is energized, an energy surge of preselected intensity is injected into the rigid conductor means 22 thereby establishing a transient magnetic field about the rigid conductor means, and inducing current flow in the wound coil 20. It is believed that the instantaneous current flow through the wound coil 20 establishes a transient magnetic field thereabout which interacts with the field about the rigid conductor means 22, creating electromagnetic forces which force the conductor turns 21 toward the bottom 31 of the slot 18.

Figure 4:
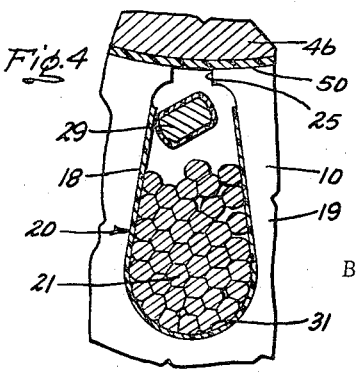
FIGURE 4 is an enlarged fragmentary view of the coil-accommodating slot and apparatus illustrated in FIGURE 3, the view of FIGURE 4 showing the compaction and change in cross-section of the conductor turns achieved by the present invention and also showing the rigid conductor means in its supported position.

The finally developed or altered configuration of the turns is illustrated in FIGURE 4. It will be understood that if the electrical pulse or surge of energy injected into the rigid conductor means 22 is of great enough magnitude, it will force the conductor turns of the coil 20 against the slot bottom 31 with sufficient force to change the cross-section of at least the majority of the conductor turns carried in the slot. This final conductor configuration will be seen in FIGURE 4. Further, after the core is saturated, it is believed that additional compaction of the coil is achieved by attractive forces between the individual coil turns. It is also believed that such core saturation occurs almost instantaneously, or during the initial portion of the energy surge. Typically, it has been estimated that in order to change the cross-section of round aluminum conductors, approximately 10,000 pounds per square inch must be applied against the conductors, and in order to change the cross-section of round copper conductors, approximately 18,000 pounds per square inch must be applied thereagainst.

The forces generated against the conductor turns in the stator slots by the exemplification is of sufficient magnitude to change the cross-section of at least a majority of the conductors in the slot and hence achieve an unusually high slot space factor, well over 60%. Stated otherwise, the voids or spaces between the conductor turns in the slot are virtually eliminated by the resulting surface-to-surface contact between the previously round conductors as the conductors change cross-section in response to the force thereagainst. Further, the change of cross-section is attained without deleteriously affecting the quality of the insulation covering the wire. It should also be understood that there is a wedging effect produced by this change of cross-section of the conductors, wherein the conductors are wedged in the slot. The conductor turns will therefore be retained in the slot without the need for auxiliary holding means to retain them in the slot as the stator core is transferred during subsequent stages of fabrication.

Figure 2:
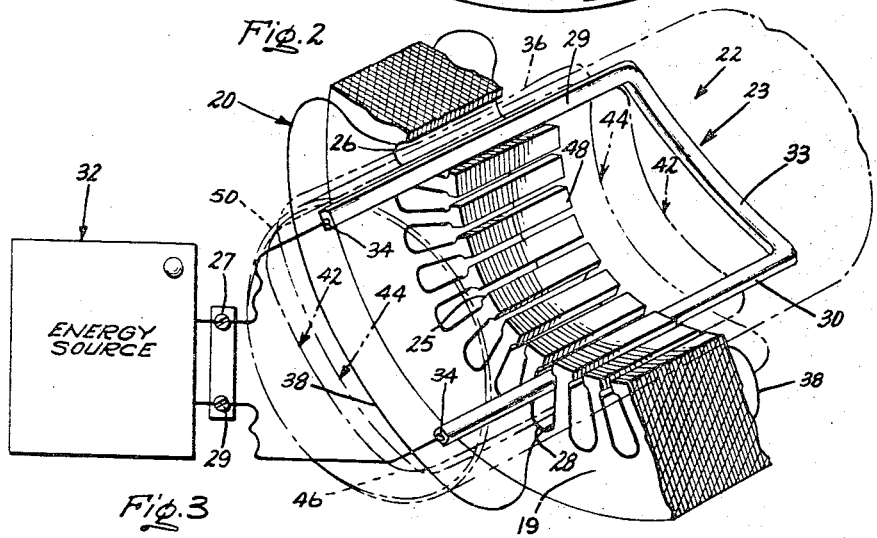
FIGURE 2 is a fragmentary perspective view of the stator core and apparatus illustrated in FIGURE 1, showing schematically the connection of the rigid conductor means to a source of electrical energy, and with one wound coil illustrated in initial, intermediate and final altered or developed positions in the core.

In applying my invention to a two-pole stator core similar to the one illustrated in FIGURES 1 and 2, and particularly to a wound coil comprised of forty conductor turns and wound to an original slot space factor of 63 percent carried in such a stator core, an energy surge of 2,767.5 joules at 3000 volts was injected into the rigid conductor means 22 supported in the coil-accommodating slot 18. The resulting current flow through the rigid conductor means was approximately 75,000 amperes (peak) and the final slot space factor, as illustrated in FIGURE 4 was calculated to be approximately 90%. The conductor turns in this instance were 0.0508 inch diameter aluminum wire insulated with polyvinyl formal or "Formex" insulation, and the rigid conductor means 22 illustrated in FIGURE 3 was 0.096 by 0.160 inch rectangular insulated copper.

In applying my invention to another stator core 10, rigid conductor means similar to means 22 was used to compact and alter the configuration of 51 conductor turns carried in a stator slot. The conductor turns in this instance were 0.0427 inch diameter copper wire insulated with "Formex" insulation, and the energy injected into the conductor means 22 was approximately 4,590 joules at 3000 volts. The resulting current flow in the rigid conductor means was 9,000 amperes (maximum) and the resulting compaction and alteration of the conductor turns carried in the slot was similar to the results illustrated in FIGURE 4, a slot space factor of approximately 90% being attained.

Referring again to FIGURES 1–4 inclusive in order to explain how the method described above was carried out in actual practice, I will now more fully describe the rigid conductor means 22 and the manner in which it was supported in the stator slots. The rigid conductor means 22, as illustrated in FIGURE 2, comprises a generally U-shaped member 23 of electrically conductive material, the material actually used being copper in this instance. The member 23 includes two opposed leg portions 28 and 30 connected by a bight portion 33. The leg and bight portions are generally rectangular in cross-section (in one exemplification 0.096 by 0.160 inch). The opposed leg portions 28 and 30 of the member 23 are shaped to fit into the core slots, and are moved into opposed coil-accommodating slots 26 and 28 axially from one end of the stator. These slots 26 and 28 accommodate the side portions 36 of the wound coil 20 therein. At each free end of the leg portions 28 and 30 there are suitable terminals 34 to enable the structure 23 to be connected across the output terminals 27 and 29 of an electrical energy surge source 32 as illustrated in FIGURE 2.

Referring further to FIGURE 2, it will be observed that the wound coil 20 is illustrated schematically in full lines in its final location relative to the core 10, with the coil side portions 36 pressed toward the slot bottoms 31 of the coil-accommodating slots 26 and 28 and with the end turn portions 38 pressed back towards the stator core end faces 19. I have also shown the initial location of the wound coil 20 in the slots 26 and 28 at 42, and an intermediate location at 44. The three locations of the coil 20 in the slots 26 and 28 are shown in this manner in order to illustrate a further aspect of my method.

The initial designation 42 denotes the location of the coil when it is placed in the slots by a suitable machine for that purpose. The intermediate designation 44 denotes the coil location after an initial energy surge is injected into the structure 23. When the initial energy surge of energy is injected into the member 23 from surge source 32, the coil 20 is moved to the intermediate position 44 with the coil side portions 36 adjacent the slot bottoms; however, the coil end turn portions 38 are only slightly affected. The wound coil 20 is then connected across the output terminals 27, 29 of the surge source 32 and the terminals 34 of the member 23 are shorted together to provide a closed electrical path in the member. With a rigid structure 46 of electrically conductive nonmagnetic material capable of conducting eddy currents disposed in the stator bore 48, a surge of energy is then injected directly into the wound coil 20. Electromagnetic forces are created between the coil end turn portions 38 and the structure 46, and the coil end turn portions 38 are moved to their final location adjacent the stator end faces 19, as shown in FIGURE 2. The side portions 36 of the coil 20 will also be further compacted at this time.

As will be seen in FIGURES 1 and 2, the structure 46 comprises a generally cylindrical member shaped to fit the stator bore 48 and includes an insulative layer 50 for electrically insulating the structure 46 from the conductor windings. The insulative layer may either be a separate hollow member or integrally formed on the surface of the structure 46, as desired. Since the structure 46 is capable of conducting eddy currents, when current flows in the wound coil 20, an interaction of electromagnetic forces takes place between the coil end turn portions 38 and the structure 46 to press the end turn portions to the position illustrated in FIGURE 2.

It will be understood that the U-shaped member 23 may be mechanically supported in the stator core 10 by suitable supporting means, if so desired. I have found, however, that the structure 46 comprises means for supporting member 23 in the coil-accommodating slots 26 and 28. The support is achieved by electromagnetic forces established between the member 23 and the conductor turns 21 in the slots 26 and 28 and the structure 46 when an energy surge is injected into either the member 23 or the coil 20. Thus, it is believed that equal and opposing forces are established between the member 23 and the conductor turns 21 and between the member 23 and the structure 46, the forces acting to rigidly support the member 23 somewhere between the turns 21 and the structure 46. Since the forces are opposing, and only the turns and the member 23 are movable, the forces will balance or equalize when the turns have been pressed toward the slot bottom 31 as far as possible and when the member 23 is at a predetermined location between the conductor turns 21 and the structure 46, as illustrated in FIGURE 4. Of course, it will be understood that the force generated between the member 23 and the conductor turns 21 of the coil 20 forces the conductor turns downwardly toward the slot bottom 31 as well as balancing the opposing force generated between the member 23 and the structure 46.

While I have described my method as it is practiced by the exemplified apparatus of FIGURES 1–4, the method may also be practiced by the apparatus illustrated in FIGURES 5–8 inclusive. I have shown therein a second type of rigid conductor means for practicing the method. Referring first to FIGURE 5, wherein like numerals refer to like parts, the second form of rigid conductor means is generally denoted by reference numeral 52 and includes a rigid conductor carrying structure or fixture 54 shaped to fit the bore of a stator such as the stator 10. The structure 54 is a generally cylindrical, elongate member constructed of electrically conductive nonmagnetic material 56 capable of conducting eddy currents and has portions encapsulated by suitable insulating material 58. The structure 54 carries three pairs of rigid conductor bars, the pairs being generally denoted by the reference numerals 60, 62, 64, respectively. Each pair of conductor bars comprises a generally U-shaped member which includes leg portions 66 and 68 and an interconnecting bight portion 70, as will be observed, for example, in FIGURE 6. The leg portions 66 and 68 extend radially outwardly of and axially along the carrying structure 54, being mounted in insulated slots 72 which extend axially along the structure as will be seen in FIGURE 8, for example. Further, each leg portion of the three pairs of conductor bars includes an upstanding portion 74 of generally oblong cross-section, shaped to fit axially into a stator core coil-accommodating slot such as the slot 76 illustrated in FIGURE 8. Each upstanding portion 74 is insulated as at 80, to insure against the possibility of its shorting with the conductor turns 82, carried in the slot 76.

Referring again to FIGURE 5, it will be seen that a shunt ring 84 is mounted in the structure 54 and retained by the encapsulating insulation 58. The shunt ring 84 is in contact with each pair of conductor bars, thereby to provide a parallel electrical conduction across the three pairs 60, 62, and 64 of the conductor bars. Inwardly disposed portions 86 and 88 of the shunt ring 84 have terminals 90 and 92 respectively extending axially therefrom. The terminals 90 and 92 are supported in a rounded end portion of the structure 54 generally denoted by reference numeral 94, and rigidly maintained by the insulation 58, with portions of the terminals extending outwardly of the end portion 94 to enable electrical connections to be made therewith. The rounded end portion 94 is provided to enable the structure 54 to be easily moved into the bore of the stator core 10, as it will push back the end turns which may block the bore.

The rigid conductor carrying structure or fixture 54 is mounted as by mounting screws 98 and 100 on a mounting block 102, thereby being situated to receive the stator core 10 in coil altering position thereon. Thus, the stator core 10 may be moved axially onto the structure 54, with the pairs of conductor bars 60, 62, and 64 thereby being moved onto opposed pairs of coil-accommodating slots 76 carrying the side portions of wound coils therein. The conductor bars are supported in the stator slots 76, when the stator core 10 is in place, by the structure 54 which lies adjacent to the entrances of the slots.

In using the apparatus illustrated in FIGURES 5–8 inclusive to practice my method, an energy surge is injected into the pairs of conductor bars through the terminals 90 and 92 and shunt ring 84. The three wound coils, carried in the three pairs of slots in which the three pairs of conductor bars 60, 62, and 64 are supported, are connected to provide a closed path for the flow of induced current. Electromagnetic forces are thus created between the conductor bars and these wound coils thereby compacting the coil side portions toward the bottoms of these slots, as illustrated in FIGURE 8. It will be noted that the cross-section of the coil side portions is changed during the coil compaction thereby achieving a high space factor as contemplated by my method. Further, it will be understood that by using the apparatus of FIGURES 5–8 to practice my method, the configuration of three wound coils may be altered (i.e., the coils developed) at the same time. Thus, the three wound coils carried in the slot pairs in which it is most desirable to attain high space factors (i.e., the slot pairs which receive the greatest total number of conductor turns therein) may be compacted in one quick, efficient operation. Further, the end turn portions of the wound coils will normally be generally adjacent the electrically conductive nonmagnetic portion 56 of the structure 54 when the stator core is mounted on the structure 54, and hence the end turn portions of the coils will also be compacted and forced back toward the stator faces when using the apparatus of FIGURES 5–8 to practice my method.

Referring now to FIGURE 9, it will be observed that yet another exemplified apparatus for practicing my above described method is illustrated. I have shown in FIGURE 9 another rigid conductor means, in this instance, generally denoted by reference numeral 106. The means 106 comprises a plurality of flexible electrically conductive wires 108 rigidly mounted or contained in a rigid insulator structure 110. The insulator structure 110 is shaped to fit axially into a coil-accommodating slot such as the slot 112 and may be constructed of a suitable thermosetting material such as thermosetting epoxy resin, which will normally be formed about the plurality of conductive wires 108 in order to rigidly support the wires 108 in insulated spaced apart position. The structure 110 further includes a stiffening means in the form of a generally T-shaped member 116 suitably attached to the bottom of the structure. The stiffening means 116 is provided in order to insure that when forces are generated between the rigid conductor means 106 and the conductor turns carried in the slot 112, the conductor means 106 will remain rigid. While I have shown only one rigid conductor means 106 supported in one coil-accommodating slot 112, it will be understood that any desired number of such means 106 may be supported in various of the slots of a stator core at one time. It would normally be the case, for example, that two such structures 110 would be supported in two opposed slots of a core carrying therein the two side portions of one wound coil by supporting means (not illustrated) at one end of the structures 110 adjacent the end face of the stator core.

In actually practicing one form of my invention, rigid conductor means in the general form of the apparatus illustrated in FIGURES 5–8 inclusive was used. The structure 54 was disposed in a stator bore, with the three pairs of conductor bars 60, 62, and 64 being rigidly supported in three pairs of coil-accommodating slots of a two-pole stator containing 0.0508 inch diameter conductor turns of aluminum conductor wire insulated with "Formex" insulation. Two surges of electrical energy at approximately 4,590 joules at 3000 volts were injected into the rigid conductor bars, with 115,000 amperes (maximum) flowing through the bars on the first pulse, and 107,000 amperes (maximum) flowing through the bars on the second pulse. A third pulse was then injected into the bars at an energy level of approximately 5,655 joules at 3300 volts, producing 115,000 amperes (maximum) therein. The rigid conductor means or bar pairs 60, 62, and 64 were then disconnected from the energy surge source, and three wound coils carried in the three pairs of coil-accommodating slots serially connected together and connected across the energy surge source 32. With the three pairs of conductor bars 60, 62, and 64 connected to provide a closed path for the flow of induced current, an energy surge of approximately 5,100 joules at 1000 volts was injected into the three wound coils. By the above steps, the side portions of the three serially connected wound coils were compacted in their stator slots, the cross-section of a majority of the conductor turns in these slots was changed, and a relatively high space factor (approximately 79%, 73% and 70% for the outer, intermediate and inner coils respectively) was achieved. Further, the end turn portions of the three wound coils were pressed back toward the stator end faces, and the three wound coils were thereby fully developed into a final desired configuration.

In view of the foregoing, it will be apparent that by my improved methods it is not only possible to move individual conductors forming the side portions of wound coils toward the bottom of stator core slots carrying these wound coils, but it is also possible to compact them with sufficient force to actually change the cross-section of a majority of the conductors, thereby achieving unusually high slot space factors. Further, these high slot space factors are accomplished without applying any mechanical means directly to the conductor wires for affecting the required compacting forces, and hence the wire insulation is not damaged in practicing my invention. Another advantage of the invention is that the end portions of the wound coils may be pressed back concurrently, with the compaction of the side portions, and that the side portions may be wedged into the stator slots. Accordingly, I have found that by my methods I am able to accomplish coil alteration or development in a magnetic core in a rapid and economical manner, and am able in many applications to substitute relatively less expensive insulated aluminum conductor wire for copper wire as well as produce a device of improved structure.

Although the principles of my invention may be used advantageously for the development or alteration of wound coils in a stator core, it will be apparent to those skilled in the art that the principles of the invention may also be employed effectively in other inductive devices where it is desirable to alter the configuration of electrical coils.

While in accordance with the patent statutes, I have described what at present are considered to be preferred forms of my invention, it will be obvious to those skilled in the art that modifications may be made thereto without departing from the invention. It is, therefore, intended in the appended claims to cover all such equivalent modifications and variations that fall within the true spirit and scope of the invention.

What I claim as new and desire to secure by Letters Patent of the United States is:

1. A method of developing an electrical winding carried in coil-accommodating slots of a magnetic core having a bore, the winding including at least one wound coil comprising a number of conductor turns and having first and second side portions at initial locations in two coil-accommodating slots of the core and two end turn portions extending beyond opposed end faces of the core, the method comprising the steps of: supporting first and second rigid conductor means in the two coil-accommodating slots of the core respectively adjacent the first and second coil side portions, each conductor means being in close proximity to the conductor turns of its respectively adjacent coil side portion in the slots; electrically connecting the first and second conductor means across output terminals of an electrical energy surge source; and injecting a surge of electrical energy into the first and second conductor means, and establishing a transient magnetic field about the first and second conductor means, thereby inducing a surge of current flow in the wound coil and creating electromagnetic forces to move the two side portions away from their initial locations in the slots.

2. The method of claim 1 wherein the step of injecting a surge of electrical energy into the first and second conductor means includes injecting a surge of electrical energy therein of sufficient magnitude to create electromagnetic forces which will cause the cross-section of at least some of the conductor turns to be changed.

3. The method of claim 1 wherein the step of supporting first and second rigid conductor means in the two coil-accommodating slots includes disposing a rigid nonmagnetic electrically conductive structure capable of conducting eddy currents in the bore of the magnetic core, thereby creating generally equal and opposing forces between the first and second rigid conductor means and their respectively adjacent coil side portions and between the first and second rigid conductor means and the structure when a surge of electrical energy is injected into the first and second rigid conductor means.

4. The method of claim 1 wherein the step of supporting first and second rigid conductor means in the two coil-accommodating slots includes rigidly supporting the first and second rigid conductor means in the two coil-accommodating slots by disposing a supporting structure in the bore of the core, the supporting structure being in supporting contact with the first and second rigid conductor means.

5. The method of claim 1 wherein the step of supporting first and second rigid conductor means in the two coil-accommodating slots includes supporting the first and second rigid conductor means in the two coil-accommodating slots by providing means for supporting the first and second rigid conductor means at one end thereof.

6. The method of claim 1 wherein the step of supporting first and second rigid conductor means in the two coil-accommodating slots of the core includes moving the rigid conductor means into the coil-accommodating slots in such a manner as to mechanically push back at least a portion of the wound coil conductor turns.

7. A method of altering the configuration of electrically conductive turns comprising at least a portion of an electrical coil carried in coil-accommodating slots of a magnetic core, the coil-accommodating slots having an open entrance and a closed bottom, the method comprising the steps of: disposing rigid conductor means in a coil-accommodating slot having electrically conductive turns carried therein, and generating a surge of electrical energy in at least the rigid conductor means accommodated in the slot, establishing a transient magnetic field thereby to create electromagnetic forces and press the electrically conductive turns toward the closed bottom of the coil-accommodating slot away from the rigid conductor means.

8. The method of claim 7 including the additional step of disposing nonmagnetic material, capable of conducting eddy currents, adjacent the slot entrance of said coil-accommodating slot, thereby to support the rigid conductor means in the slot.

9. The method of claim 8 including the further step of supporting nonmagnetic material, capable of conducting eddy currents adjacent other portions of said electrical coil, thereby to press back these other portions of said electrical coil.

10. The method of claim 8 wherein the step of disposing rigid conductor means in a coil-accommodating slot includes supporting the rigid conductor means in said coil-accommodating slot between the electrically conductive turns and the slot entrance.

11. The method of claim 10 wherein the step of supporting the rigid conductor means between the electrically conductive turns and the slot entrance includes rigidly supporting the rigid conductor means between the electrically conductive turns and the nonmagnetic material by balanced and opposing electromagnetic forces generated between the rigid conductor means and the nonmagnetic material and between the rigid conductor means and the electrically conductive turns when the transient magnetic field is generated.

12. The method of claim 7 wherein the step of injecting a surge of electrical energy in the rigid conductor means includes injecting a surge of electrical energy therein of sufficient magnitude to change the cross-section of a majority of the electrically conductive turns carried in said coil-accommodating slot, and thereby wedging the electrically conductive turns in said coil-accommodating slot.

13. The method of claim 7 wherein the step of disposing rigid conductor means in a coil-accommodating slot includes disposing electrically connected rigid conductor means in two coil-accommodating slots carrying an electrical coil; the step of injecting a surge of electrical energy in a rigid conductor means including electrically connecting first ends of the two rigid conductor means in circuit with the output terminals of an electrical energy surge source, and energizing said electrical energy surge source.

14. The method of claim 7 wherein the step of disposing rigid conductor means in a coil-accommodating slot includes rigidly supporting the rigid conductor means in the coil-accommodating slot by providing a supporting structure thereof adjacent the slot entrance in supporting contact therewith.

15. The method of claim 7 wherein the step of disposing rigid conductor means in a coil-accommodating slot includes moving the rigid conductor means into the coil-accommodating slot in such a manner as to mechanically push back at least a portion of the electrically conductive turns.

16. A method for producing high slot space factors of electrically conductive turns disposed in slots of a magnetic core, the method comprising the steps of: generating an electrical energy surge in the turns of sufficient magnitude to establish a transient magnetic field and electromagnetic forces acting upon the turns; and altering the cross-section of the majority of the turns carried in the slots into non-circular configurations, and changing the relative positions thereof by the forces acting thereon to produce slot space factors for the turns in the neighborhood of 80% or more.

17. The method of claim 16 in which the changed non-circular cross-section configurations and altered relative turn positions are primarily determined by forces acting on the turns of approximately 10,000 pounds per square inch or more.

18. A method for altering the configuration of electrically conductive turns disposed in slots of a magnetic core, the method comprising the steps of: disposing electrically conductive turns in slots of a magnetic core, changing a majority of the turns into non-circular cross-section configurations as the turns are disposed in the slots and altering their relative positions with respect to one another by generating a surge of electrical energy in the turns thereby creating transient fields and electromagnetic forces of sufficient magnitude acting on the turns to produce compacted turns in the slots having slot space factors in excess of 60%.

19. The method of claim 18 in which the forces acting on the turns produce compacted turns tightly wedged in the slots which tend to retain their relative turn positions during subsequent operations performed on the magnetic core.

References Cited

UNITED STATES PATENTS

| 3,333,327 | 8/1967 | Larsen | 29—596 |
| 3,333,328 | 8/1967 | Rushing | 29—596 |
| 3,333,329 | 8/1967 | Linkous | 29—596 |
| 3,333,330 | 8/1967 | Linkous | 29—596 |
| 3,333,335 | 8/1967 | Sims | 29—596 X |
| 3,348,183 | 10/1967 | Hodges et al. | 29—596 |
| 3,353,251 | 11/1967 | Linkous | 29—205 |

JOHN F. CAMPBELL, *Primary Examiner.*

J. L. CLINE, *Assistant Examiner.*